United States Patent [19]

Schweizer et al.

[11] Patent Number: 5,795,114

[45] Date of Patent: Aug. 18, 1998

[54] MACHINE TOOL

[75] Inventors: Anton Richard Schweizer, Wurmlingen; Peter Grund, Trossingen, both of Germany

[73] Assignee: Chiron-Werke GmbH & Co. KG, Tuttlingen, Germany

[21] Appl. No.: 702,952

[22] Filed: Aug. 26, 1996

[30] Foreign Application Priority Data

Sep. 2, 1995 [DE] Germany ............... 195 32 397.1
Oct. 5, 1995 [DE] Germany ............... 195 37 070.8

[51] Int. Cl.⁶ .................................................. B23C 1/00
[52] U.S. Cl. ........................ 409/233; 409/230; 409/231
[58] Field of Search ............................... 409/230, 231, 409/232, 233

[56] References Cited

U.S. PATENT DOCUMENTS

| | | | |
|---|---|---|---|
| 2,557,582 | 6/1951 | Turrettini | 409/233 |
| 3,254,567 | 6/1966 | Daugherty . | |
| 3,285,101 | 11/1966 | Klingel | 409/232 |
| 3,680,436 | 8/1972 | Marsland | 409/232 |
| 3,851,364 | 12/1974 | Noa et al. . | |
| 4,552,493 | 11/1985 | Schultshick | 408/3 |
| 4,557,035 | 12/1985 | Rütschle et al. . | |
| 4,932,118 | 6/1990 | Winkler et al. . | |
| 5,147,165 | 9/1992 | Tempest | 409/232 |
| 5,240,360 | 8/1993 | Esser . | |
| 5,423,643 | 6/1995 | Suzuki et al. | 409/232 |

FOREIGN PATENT DOCUMENTS

| | | |
|---|---|---|
| 0 503 522 | 3/1992 | European Pat. Off. . |
| 2 189 169 | 1/1974 | France . |
| 32 33 934 A1 | 3/1984 | Germany . |
| 32 33 934 C2 | 10/1986 | Germany . |
| 35 05 785 C2 | 8/1991 | Germany . |
| 41 08 038 A1 | 9/1992 | Germany . |
| 432 188 | 9/1967 | Switzerland . |
| 465 361 | 12/1968 | Switzerland . |

*Primary Examiner*—A. L. Pitts
*Assistant Examiner*—Christopher Kirkman
*Attorney, Agent, or Firm*—Pretty, Schroeder & Poplawski

[57] ABSTRACT

The machine tool includes a spindle rotor, a tool receptacle and a clamp for clamping a tool in the tool receptacle. The clamp is moveable in the direction of the spindle axis by a spindle drive which is actuated by rotation of the spindle rotor. A spreading member is provided in the tool receptacle for positive gripping and clamping of the tool. The spindle drive preferably includes an externally threaded section on the spreading member and an internally threaded section on the tool receptacle, the latter being non-rotatably joined with the spindle rotor.

12 Claims, 4 Drawing Sheets

Fig. 2

MACHINE TOOL

BACKGROUND OF THE INVENTION

1. Field of the Invention

The present invention relates to a machine tool having at least one spindle for receiving tools in nonrotatable relationship, and clamping means, movable in the direction of the spindle axis, for clamping the tool in a tool receptacle of the spindle.

2. Related Prior Art

A machine tool of the aforesaid kind is known, for example, from document U.S. Pat. No. 4,557,035.

With the known machine tool, a tool holder is clamped by the fact that a cup-shaped element moves over the head of the tool holder from above and is positively snap-locked thereon. Arranged on the upper end of the element is a tension bar by means of which the cup-shaped element, together with the tool holder, are pulled in upward direction and into the tool receptacle. The required tensile force is permanently applied via a cup spring assembly. Overpressure is hydraulically applied to the cup spring assembly for a short time when the clamping mechanism is to be released in order to allow the clamped tool to be released and, therafter, a new tool to be clamped.

It is, thus, a disadvantage of the known machine tool that a continuous axial tensile force must be applied and maintained through the spindle head throughout the full time of operation of the tool.

In some applications, however, it is desireable to clamp the tool in use only in its direct neighborhood. This is the case especially when the tool on the spindle head is to be displaced along an additional axis, as may be the case for example with a facing head.

It is already known to use hollowing or facing heads of this kind in machining centers. These are understood to mean arrangements with which it is possible, for example, to face-turn large areas on workpieces. The particularity of these facing heads is that a facing tool can be displaced radially with respect to the spindle axis so that the turning diameter is variable. In this fashion a further numerical axis is obtained in numerically controlled machining centers.

In the known machining centers with a facing head, for example, the entire facing head including the facing tool is installed or exchanged for a complete new facing head with facing tool. Because of the very high weight of these arrangements, this is generally accomplished by manual installation. The radial distance between the cutting edge of the facing tool and the spindle axis is also, as a rule, adjusted manually.

On the other hand, it is also known to leave the facing head on the spindle of the machine tool, and to exchange the facing tools manually. In this case the facing head has a tool receptacle with a spreading member for positive gripping and clamping of tool holders which hold the tools, the spreading member being actuatable by means of a spindle drive. This spindle drive is actuated manually by the fact that a kind of screwdriver is inserted through the spindle carrying the facing head, which for this purpose is configured as a hollow spindle, and the spreading member is tightened or is loosened in order to release the tool holder. The tool holders are manually inserted into or removed from the tool receptacle of the facing head.

In view of the above it is an object of the present invention to improve the machine tool as mentioned at the outset in such a way that automatic clamping of the tool is achieved in a simple way in terms of design.

According to the invention this object is achieved with the machine tool mentioned at the outset in that the movement of the clamping means in the direction of the axis is produced by rotation of the spindle and/or its spindle rotor.

The object of the invention is completely achieved in this manner.

The fact that the spindle and/or the spindle rotor, which are anyway provided with a separate drive in the case of a numerically controlled machine tool, are used for clamping the machine through the movement of the clamping means, leads to an especially simple structural design of the novel machine tool. It is, for example, imaginable that the tool, being presented by a gripper and inserted in a tool holder, is nonrotatably held in the gripper relative to the spindle so that when the spindle is rotated the tool holder is sort of screwed into the tool receptacle. On the other hand, it is also possible to first introduce the tool holder into the tool receptacle, where it is then nonrotatably joined with the spindle and/or the spindle rotor, by means of suitable sliding blocks, etc. By rotating the spindle and, thus, the tool holder the latter is then clamped via a suitable screw connection.

In a particularly preferred embodiment of the invention, the movement of the clamping means in the direction of the axis is produced via a spindle drive which is actuated by rotation of the spindle and/or its spindle rotor.

Due to the use of a spindle drive, the tool is advantageously clamped in the tool receptacle in a self-locking way so that no tensile forces or the like have to be applied and maintained over a long distance, for example in vertical direction through the spindle head. The tool receptacle, therefore, can be configured to be largely autonomous, and can be displaced during operation of the machine tool relative to the spindle head.

In a preferred embodiment of the machine tool according to the invention, a spreading member is provided in the tool receptacle for positive gripping and clamping of the tool, the spindle drive being preferably constituted by an externally threaded section on the spreading member and an internally threaded section on the tool receptacle, the latter being nonrotatably joined with the spindle and/or its spindle rotor.

This feature provides the advantage that all elements needed for clamping the tool are arranged in the direct neighborhood of the tool receptacle, whereby a particularly compact and autonomous unit is obtained.

According to a further embodiment, the spreading member has a catch by means of which preferably the externally threaded section can be rotated relative to the internally threaded section.

This feature provides the advantage that the clamping operation can be adjusted from the outside, by a simple positive coupling arrangement.

According to a further embodiment, the catch can be brought into engagement with a coupling rod that is equipped on one end with a mating element complementary to the catch.

It is an advantage of this feature that the spreading member can be adjusted, or otherwise operated, even from a remote point.

This is true in particular when the coupling rod can be axially displaced by means of a piston-cylinder unit so that the catch and its mating element can be moved into or out of mutual engagement.

This feature provides the advantage that the spreading member can be uncoupled completely from the actuating elements, namely the coupling rod, by simple actuation of the piston-cylinder unit, so that, for example, the tool receptacle, with the tightened spreading member, can be displaced relative to the spindle and, thus, relative to the coupling rod.

In a preferred improvement of the last-mentioned embodiment, the coupling rod is arranged in the spindle axis.

This feature provides the advantage that a very compact structure is obtained. On the other hand, it is an advantage of this feature that the spreading member can be actuated in a reference position, which simultaneously defines a centering position relative to the spindle axis.

According to still further embodiments of the invention, the tool receptacle is formed on a facing head and can be adjusted, preferably in a numerically controlled way, in a direction perpendicular to the spindle axis.

It is an advantage of this feature that it provides an additional axis in the radial direction of displacement of the facing tool. Given the fact that the facing tool is clamped autonomously in the tool receptacle, it can be displaced relative to the spindle axis in a simple way, without this having an influence on the clamping of the tool.

According to a preferred improvement of this embodiment, the facing head can be adjusted in such a way that the catch and its mating element can be brought into a mutually aligned position.

This feature is connected with the advantage that a desired working position, or a position in which clamping of the tools can be released, can be approached, for example in a numerically controlled way, and that tools that must be operated in centered relation to the axis of rotation of the spindle, such as milling cutters or drill bits, can also be used.

In the case of particularly preferred embodiments of the invention, the spreading member can be immobilized non-rotatably in such a way that the spindle drive is activated by rotation of the tool receptacle, the latter being nonrotatably joined with the spindle and/or the spindle rotor.

It is an advantage of this feature that for clamping the tools only the tool receptacle has to be rotated, which can be effected by the spindle drive anyway present. On the other hand, the spreading member only needs to be retained in nonrotatable relationship.

It is further preferred if the coupling rod is provided with a coupling for selective nonrotatable immobilization of the coupling rod.

This feature is advantageous insofar as the desired non-rotatable immobilization of the spreading member can likewise be effected in a romote-controlled way, via a suitable coupling.

It is particularly preferred in this connection if the coupling is a ratchet coupling with an adjustable threshold value for its holding torque.

It is the advantage of this feature that a predetermined breakaway torque can be adjusted for both the clamping and the release of the tool. The clamping torque can be preset during clamping of the tool, for example at 15 Nm, in which case the coupling will disengage when this threshold value is exceeded.

This operation can be detected due to the fact that according to another preferred development of the invention a sensor is provided for detecting the ratcheting operation. Correspondingly, another threshold value of, for example, 25 Nm can be preset for the torque during release of the tool, and the fact that this threshold is exceeded can also be detected by the sensor. Thus, the beginning and the end of the clamping operation, and also of the releasing operation, can be safely detected for purposes of the control of the machine tool.

Further advantages are evident from the description and the attached drawings. It is understood that the features mentioned above and those yet to be explained below can be used not only in the respective combinations indicated, but also in other combinations or in isolation, without leaving the context of the present invention.

BRIEF DESCRIPTION OF THE DRAWINGS

Embodiments of the invention are depicted in the drawings and will be explained in more detail in the description below. In the drawings.

DETAILED DESCRIPTION OF A PREFERRED EMBODIMENT

Figure 1:
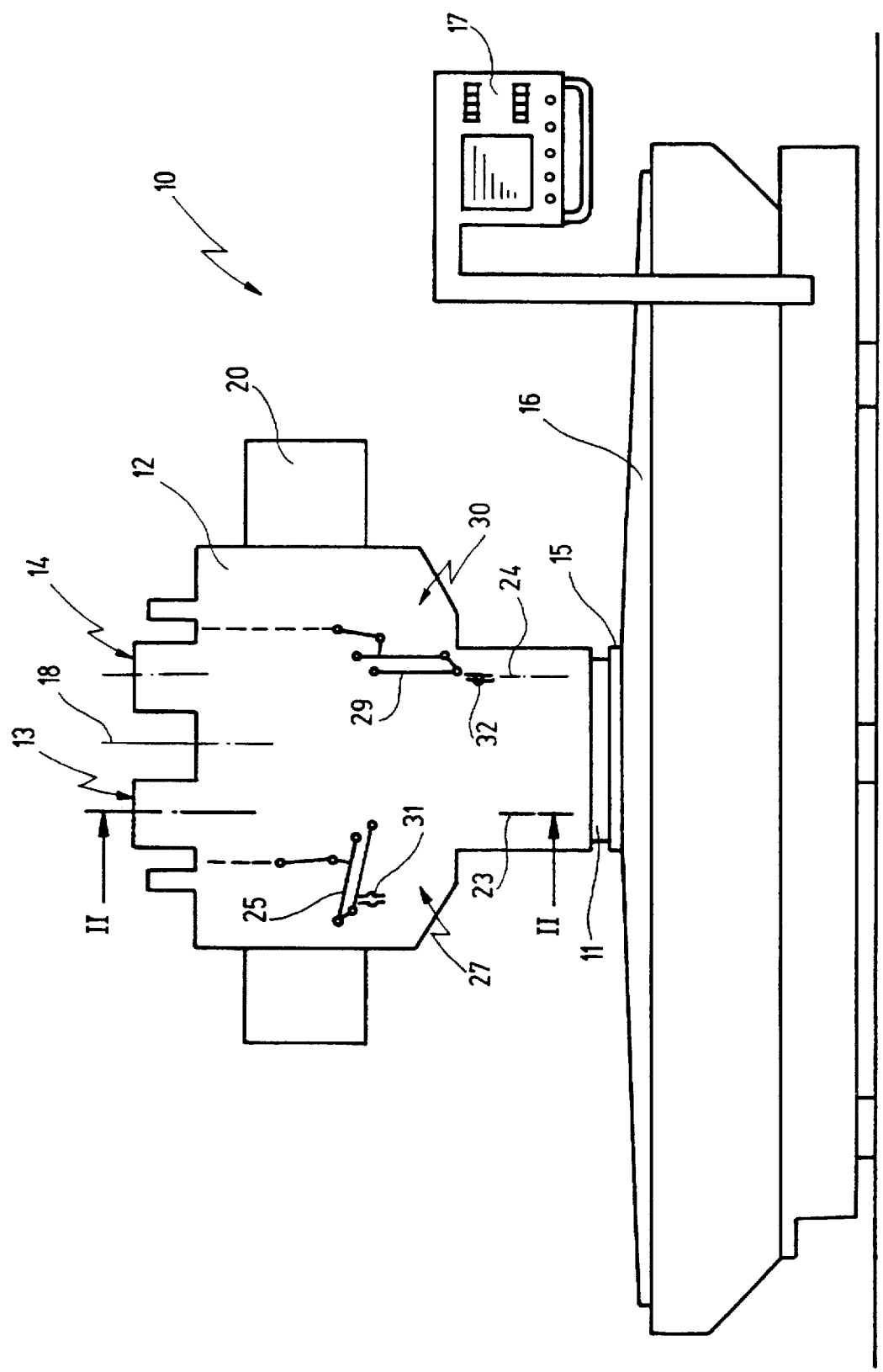
FIG. 1 shows an extremely schematic front view of an embodiment of a machine tool according to the invention.

In FIG. 1, a machine tool is generally designated by reference numeral 10. In the present case, "machine tool" is understood to mean in particular a "machining center," i.e. a numerically controlled machine tool in which drilling, milling, and turning tasks are performed in particular. Machining centers of this kind have available either a tool magazine in which a number of different tools are stored in tool holders, or a large number of tool changers in which the tools are permanently held in their magazine position between tooling times. By means of one or more such tool changers, these tools are inserted as needed into a spindle of the machining center so that a specific machining operation can proceed under numerical control. Once the particular machining step is complete, the tool just used is unclamped and a new tool for the next machining operation is clamped. Machining centers of this kind are generally known.

Machine tool 10 in FIG. 1 is a "traveling column" machine, in which a traveling column 11 is equipped with a spindle head 12. Spindle head 12 is displaceable on traveling column 11, in particular in the vertical direction.

In machine tool 10 depicted in FIG. 1, spindle head 12 is fitted with two spindles, i.e. a first spindle 13 and a second spindle 14.

As shown in FIG. 1, traveling column 11 is displaceable on a pedestal 15 perpendicular to the drawing plane. Pedestal 15 is in turn, as shown in FIG. 1, displaceable to the right and to the left on a stationary machine bed 16. Overall, therefore, spindle head 12 can be displaced along three Cartesian coordinates.

A control panel 17, which serves for numerical control of machine tool 10, is provided to control the movement sequence and the entire machining operation.

Spindle head 12 is configured substantially symmetrically with respect to a central axis of symmetry 18. Spindles 13, 14 are configured with vertical axes. Their axes are designated in FIG. 1 as 23 and 24, respectively.

A first gripper arm 25 of a first tool changer 27 is located in the vicinity of first spindle 13, while a second gripper arm 29 of a second tool changer 30 is located in the vicinity of second spindle 14. By means of gripper arms 25, 29, tools 31, 32 of any kind can be deployed into spindles 13, 14, respectively. As shown in FIG. 1, only one gripper arm 25, 29 is associated with each spindle 13, 14, respectively. It is understood, however, that there can be associated with each spindle 13, 14 a plurality of alternately acting gripper arms, which each carry a tool 31, 32 and alternate between a working position in which the tool is located in spindle 13, 14, and a magazine position in which, pulled back from spindle 13, 14, they hold tool 31, 32 ready for the next deployment.

The particularity of machine tool 10 consists in the fact that second spindle 14 is designed in conventional fashion for drilling and milling work, while first spindle 13 is equipped with a facing head in order, for example, to be able to face-turn specific surfaces on the workpieces being machined, or to hollow out contours.

Of course machine tool 10 can also be designed so that only one spindle, namely spindle 13, is provided, and carries a facing or hollowing head in which, in addition to facing tools, "standard" tools such as drill bits, milling cutters, etc. can be deployed; these tools must of course be positioned centeredly in the facing head.

Figure 2:
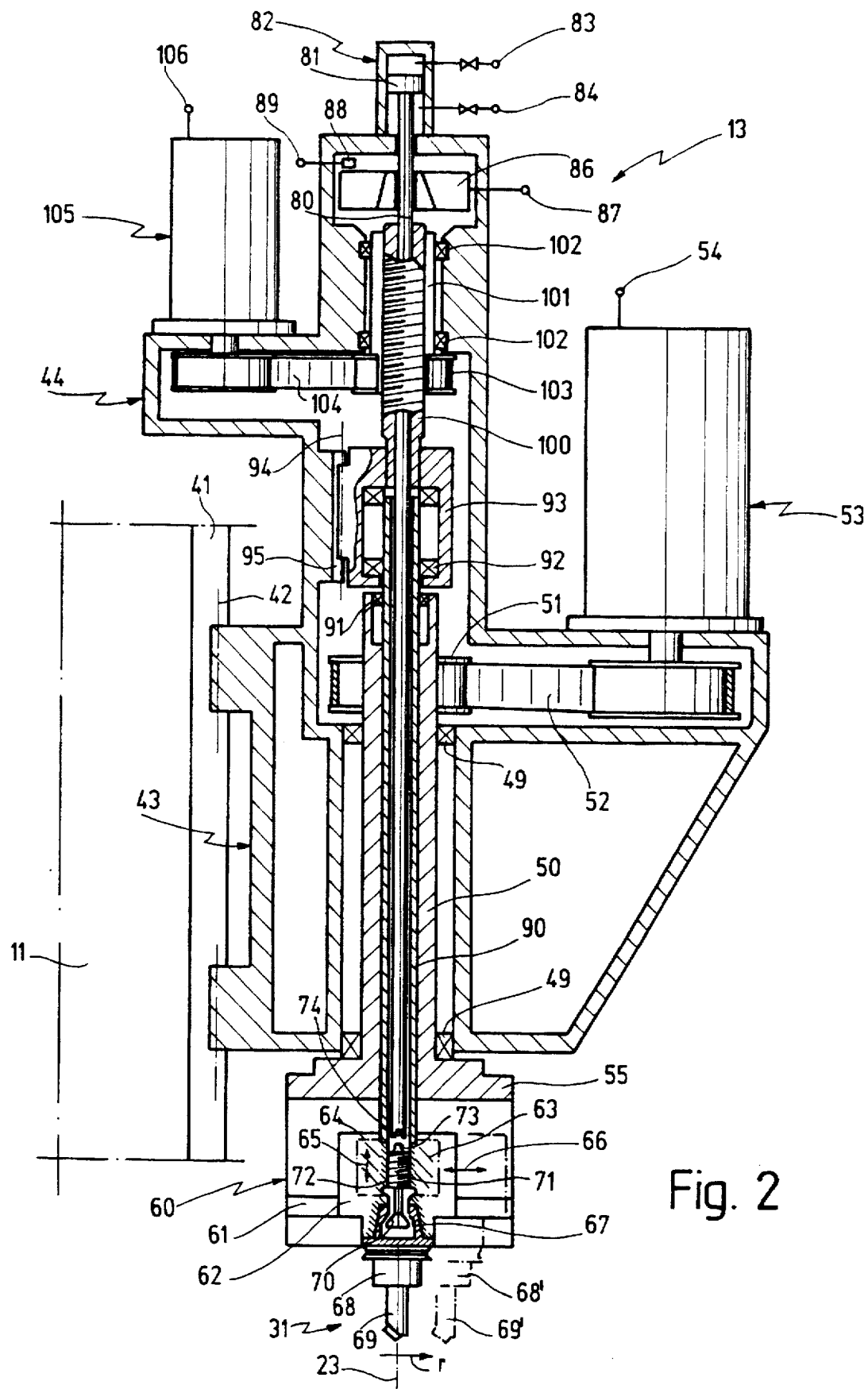
FIG. 2 shows, at enlarged scale, a cross-sectional representation along line II—II of FIG. 1.

Further details of first spindle 13 are evident from the enlarged cross-sectional representation according to FIG. 2.

It is evident first of all that a vertical rail 41, on which a slide 43 is displaceable along a vertical axis 42, is arranged on traveling column 11. Slide 43 carries a spindle housing 44. The drive and control units provided for this purpose are known in the art, and are not shown in FIG. 2 for the sake of clarity.

Mounted on the lower end of spindle housing 44 in a central receptacle thereof are bearings 49 that serve to support a spindle rotor 50. Spindle rotor 50 is nonrotatably joined, in the vicinity of its upper end, to a belt pulley 51 that can be driven via a belt 52 by a spindle drive 53. Spindle rotor 50 can thus be caused to rotate by means of a control line 54.

The lower end of spindle rotor 50 ends in a rotationally symmetrical flange 55. Flange 55 serves to mount a facing head designated generally by reference numeral 60.

Facing head 60 is equipped with a horizontally extending rail 61. A slide 62 runs on rail 61. Slide 62 is equipped with a 45-degree tooth set 63 acting in a vertical plane. By means of a mating tooth set 64, details of which will be explained below, a vertical movement (arrow 65) of the mating tooth set can be converted, in the manner of a wedge drive train, into a horizontal movement (arrow 66) of 45-degree tooth set 63. 45-degree tooth set 63 and mating tooth set 64 thus constitute a drive train for converting a vertical movement into a horizontal movement.

The vertical drive movement is used to displace slide 62 on the facing head in the horizontal direction (arrow 66).

A tool receptacle 67 of conventional design is arranged at the lower end of slide 62. Tool receptacle 67 is configured as a female taper, and positively receives a tool holder 68 which is configured at its upper end as a standard hollow-shaft taper that has a shape complementary to tool receptacle 67.

Here tool holder 68 carries a facing tool 69 at its lower end, although an "ordinary" tool 31, 32 could also be received. When a vertical drive movement is then converted by drive train 63/64 into a horizontal movement of slide 62 along rail 61, facing tool 69 is thus displaced in a horizontal plane as indicated by 68', 69' in FIG. 2. The cutting edge of facing tool 69, which was originally located in the axis 23 of spindle 13, moves on it in a radial direction r away from axis 23. In this manner known in the art, facing head 60 can thus be used to turn down surfaces with different turning radii.

Tool receptacle 67 further comprises a spreading member 70 which in the unspread state can be introduced onto the upper end of tool holder 68 or into it, while in the spread state, spreading member 70 positively grips tool holder 68 and can pull it in a vertical direction into tool receptacle 67 and clamp it there.

Spreading member 70 is equipped in the upper region with an externally threaded section 71. Externally threaded section 71 runs in an internally threaded section 72 of tool receptacle 67, i.e. in slide 62. Threaded sections 71, 72 thus constitute a spindle drive.

At the upper end, spreading member 70 ends in a catch 73, for example a horizontal rib. Evident above catch 73 is a mating element 74 that is adapted in terms of shape to catch 73.

Mating element 74 constitutes the lower end of a coupling rod 80. Coupling rod 80 is arranged in the axis 23 of spindle 13. At the upper end, coupling rod 80 ends in a piston 81 of a piston-cylinder unit 82. Unit 82 is equipped with control lines 83, 84 so that piston 81 can be displaced in a vertical direction.

It is thus possible either to lift mating element 74 away from catch 73, as shown in FIG. 2, or to bring mating member 74 into engagement with catch 73.

Coupling rod 80 is surrounded, below its upper end, by a coupling 86 that in turn is equipped with a control line 87. Coupling 86 is arranged in stationary fashion, and serves to lock coupling rod 80 nonrotatably when control line 87 is acted upon by a corresponding signal.

Coupling 86 is configured as a ratchet coupling. This means that coupling 86 locks up until an adjustable limit value of the torque acting on it has been reached, and then releases; the held part, namely coupling rod 80, can rotate only into the next locking position of the ratchet elements, e.g. through 180 degrees, until coupling 86 once again positively locks.

A sensor 88 arranged above coupling 86 serves to detect this kind of ratchet operation. A control signal can be derived from sensor 88 via a control line 89.

An adjusting rod 90, which surrounds coupling rod 80 as a tube, serves to actuate mating tooth set 64.

At the lower end, adjusting rod 90 ends in the aforementioned mating tooth set 64, which is not depicted in detail in FIG. 2 for the sake of clarity.

Adjusting rod 90 is held in the radial direction in the upper end of spindle rotor 50 by means of radial bearings 91. Adjusting rod 90 is held in a slide 93 by means of thrust bearings 92. This means that adjusting rod 90 can rotate in slide 93, but cannot shift axially with respect to slide 93.

Slide 93 is displaceable along a vertical axis 94 on a rail 95 that is configured on the inside of spindle housing 44.

Slide 93 is rigidly joined at its top end to a ball spindle 100 which also loosely surrounds coupling rod 90. A spindle nut 101, which in turn is axially retained in thrust bearings 102, runs on ball spindle 100.

Spindle nut 101 is joined nonrotatably at its lower end to a belt pulley 103. Belt pulley 103 is in turn driven via a belt 104 by an adjusting drive 105. A control line 106 serves to control adjusting drive 105.

The arrangement according to FIG. 2 operates as follows:

When tool holder 68 is introduced from below into tool receptacle 67, an operation that will be described in further detail below with reference to FIGS. 3 and 4, spreading member 70 comes into engagement with tool holder 68. Actuation of piston-cylinder unit 82 then displaces coupling rod 80 downward out of the position indicated in FIG. 2, until mating element 74 grips catch 73. As soon as this has happened, coupling 86 is closed via control line 87, a limit value for the holding torque in coupling 86 of, for example, 15 Nm being set.

Actuation of spindle drive 53 then rotates spindle rotor 50 and thus slide 62 and tool receptacle 67. Since spreading member 70 is held nonrotatably by coupling rod 80, spreading member 70 moves upward by means of the spindle drive constituted by threaded sections 71, 72, and pulls tool holder 68 into tool receptacle 67.

As soon as the preset torque of, for example, 15 Nm is reached, ratchet coupling 86 snaps out. This ratcheting operation is detected by sensor 88 and reported via control line 89 to control panel 17, whereupon spindle drive 53 is stopped.

Coupling 86 is then released again, and coupling rod 80 is displaced upward by means of piston-cylinder unit 82 so that mating element 74 is again out of engagement with catch 73.

Facing tool 69 is now ready for use. Depending on the facing task involved, facing tool 69 is then shifted in radial direction r. For this purpose, adjusting drive 105 is activated via control line 106. Vertically fixed spindle nut 101 is rotated by belt drive 103, 104, and pulls ball spindle 100 upward or downward. Ball spindle 100 entrains adjusting rod 90 vertically by means of slide 93. Mating tooth set 64 then runs on 45-degree tooth set 63 of slide 62 so that the latter shifts in the horizontal direction (arrow 66) into, for example, the position 68', 69' indicated in FIG. 2 with dot-dash lines. In this position the facing operation can be performed.

For a subsequent tool change, slide 62 must first be displaced on rail 61 back into a position in which the axis of spreading member 70 aligns with spindle axis 23 and thus with coupling rod 80. Then the operations described above can follow. For unclamping tool holder 68, the limit torque in coupling 86 is preferably set higher, for example to 25 Nm, because a higher torque is required for releasing.

It is important in this context that according to the invention, facing head 60 remains on flange 55 of spindle rotor 50, and only facing tools 69 are exchanged.

Figure 3:
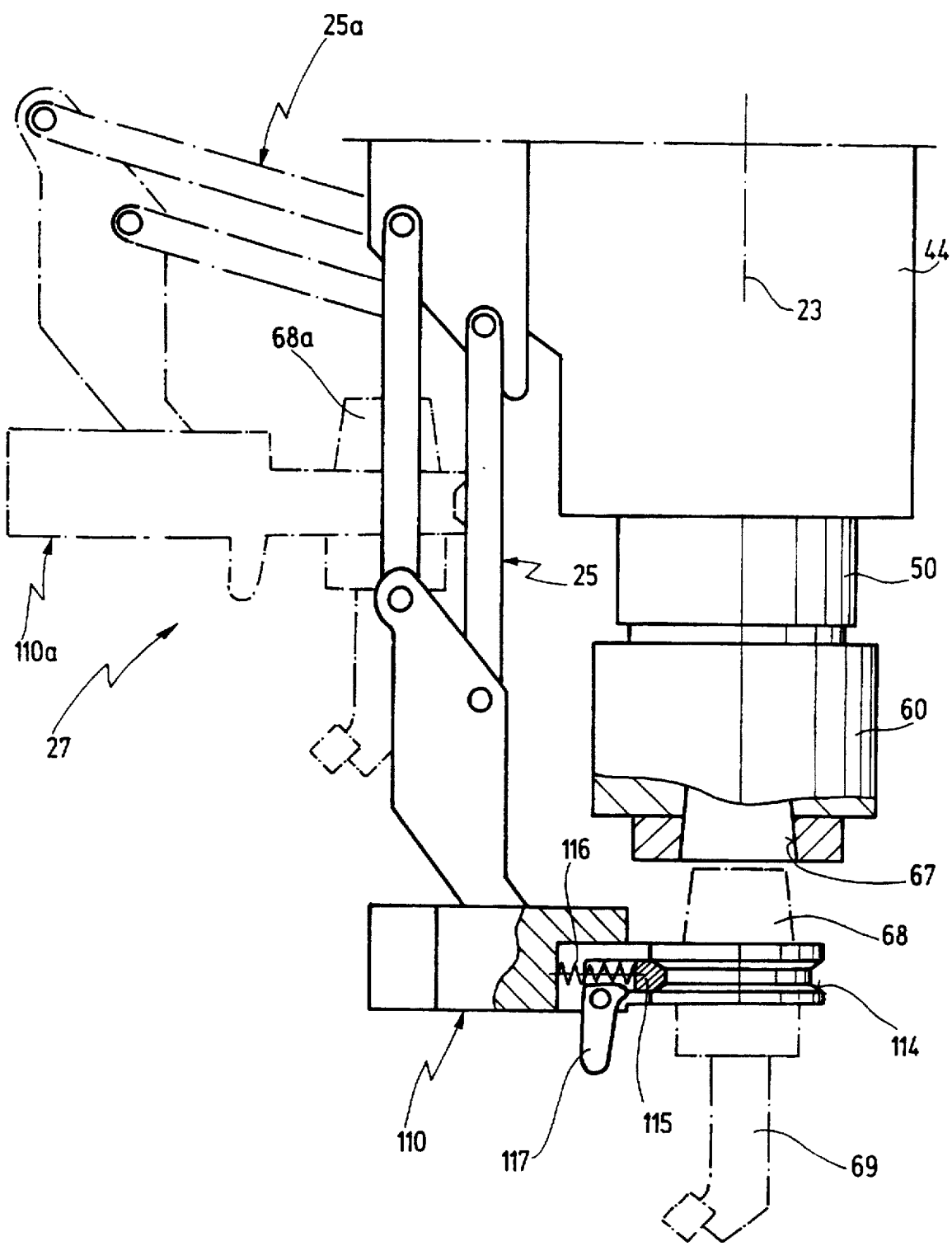
FIG. 3 shows an even further enlarged detail view to explain a tool changer such as can be used on the machine tool according to FIGS. 1 and 2.
Figure 4:
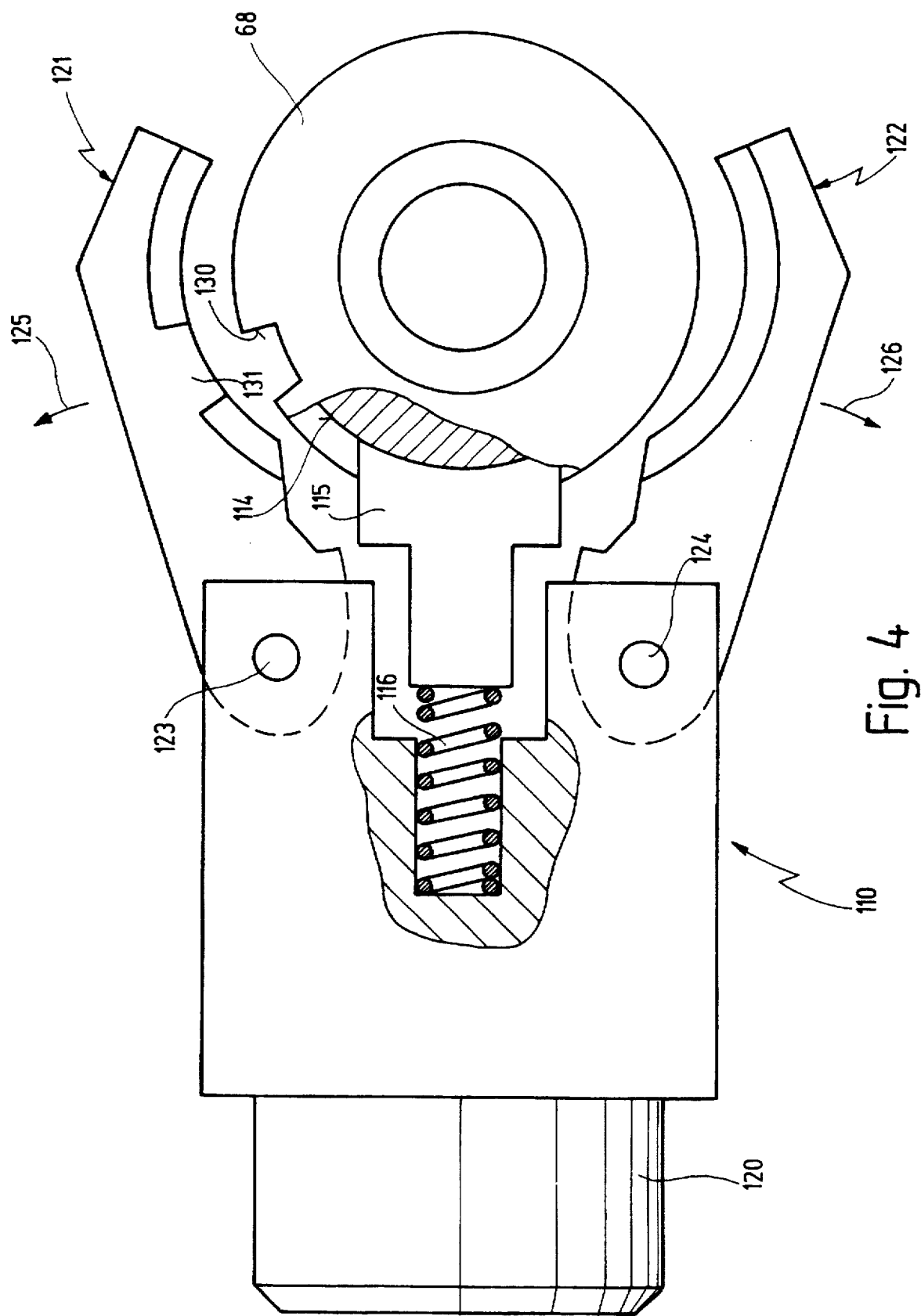
FIG. 4 shows, at even further enlarged scale, a plan view of a gripper in a tool changer according to FIG. 3.

Further details of the associated tool changer 27 are illustrated in FIGS. 3 and 4.

Tool changer 27 comprises gripper arm 25, which is configured in conventional fashion as a parallelogram linkage. In FIG. 3, a working position of tool changer 27 is shown in solid lines, and a magazine position in dot-dash lines.

Tool changer 27 is equipped at its lower free end with a gripper 110. Gripper 110 grips a gripping groove 114 on tool holder 68. By means of a clamping block 115, provided on gripper 110, which engages into gripping groove 114 of tool holder 68 that is being grasped, the latter can be secured against vertical movement. Clamping block 115 is in continuous contact in gripping groove 114 under the action of a helical spring 116. By means of a lever 117, additional pressure can be applied to spring 116 and clamping block 115 can be lifted out of gripping groove 114. Lever 117 can be servomechanically actuated, but preferably it is configured as a manual lever.

An actuation unit 120, for example a pneumatic, hydraulic, or electromagnetic actuation unit, is mounted on the rear end of gripper 110. Actuation unit 120 serves to actuate two claws 121, 122 which are held pivotedly and symmetrically in two axes 123, 124. Claws 121, 122 can thereby be opened, as indicated by arrows 125, 126, or they can be placed tightly around tool holder 68. Further details of the actuation unit of a gripper 110 of this kind are described, for example, in EP 0 481 275 B1.

A snap groove 130 is evident on the upper (in FIG. 1) circumference of tool holder 68. Facing snap groove 130 is a snap block 131 that is configured on the top (in FIG. 4) claw 121 of gripper 110.

Tool changer 27 illustrated in FIGS. 3 and 4 operates as follows:

Tool changer 27 is first located in the magazine position indicated in dot-dash lines in FIG. 3. Gripper arm 25a is in this instance pivoted obliquely upward and outward, so that tool holder 68a is spaced outward and upward away from facing head 60. In this position tool holder 68a can be manually loaded when a new sequence of machining operations needs to be prepared. To do so, the user of the machine tool actuates lever 117 so that when claws 121, 122 are open, it is possible to remove the tool holder used previously, and reload with tool holder 68a required for the next machining task.

When the relevant tool is then called up in the numerical control program, tool holder 27 is pivoted out of the magazine position into the working position. In the process, tool holder 68 is first presented to tool receptacle 67 from below, i.e. moved into a position in which tool holder 68 is still at a small vertical distance from tool receptacle 67.

Since the arrangement is, in a manner known in the art, such that tool receptacle 67 can be displaced in the vertical direction relative to tool changer 27, tool holder 68 can be moved from below into tool receptacle 67.

During that movement sequence described so far, it is important that tool holder 68 is held in a predefined circumferential position. This is achieved by the fact that with claws 121, 122 closed, snap block 131 engages into snap groove 130 so that tool holder 68 is immobilized in the circumferential direction. This reference circumferential position is thus already defined during the loading of gripper 110. In addition, as mentioned, tool holder 68 is immobilized in the vertical direction by means of clamping block 115 which engages into gripping groove 114.

When the tool holder is then moved from below into the region of tool receptacle 67, positive entrainment elements, for example a groove block on spindle rotor 50 and a groove in the upper radial surface of tool holder 68 (neither one depicted), come into engagement with one another. The defined circumferential position is thus further guaranteed. Claws 121, 122 can then be opened by means of actuation unit 120, as depicted in FIG. 4. Tool holder 68 is thus free to rotate but still immobilized in the vertical direction, as a result of the interaction between tool receptacle 67/hollow shaft taper and clamping block 115/gripping groove 114.

Once tool holder 68 is in this position, the coupling process already described above in conjunction with FIG. 2 begins; in this, after coupling rod 80 is locked, spindle rotor 50 rotates tool receptacle 67 via spindle 13 in order to tighten spreading member 70. Since at this time tool holder 68 is already non-rotatably coupled to tool receptacle 67, tool receptacle 68 also rotates during this clamping operation, so that claws 121, 122 must previously have been opened.

In this position gripper 110 can then remain on tool holder 68 even when the latter is performing its machining task. Alternatively, however, it is also possible to move gripper 110 in the horizontal direction away from tool holder 68 so that no further mechanical contact exists.

We claim:

1. A machine tool comprising:

at least one spindle having a spindle axis, a spindle rotor mounted at said spindle for rotation about said spindle axis, a tool receptacle arranged at said spindle rotor for receiving a tool in non-rotatable relationship, and clamping means, said clamping means being movable in the direction of said spindle axis by rotation of said spindle rotor for clamping said tool in said tool receptacle;

wherein the movement of said clamping means in the direction of said axis is produced via a spindle drive which is actuated by rotation of said spindle rotor;

wherein a spreading member is provided in the tool receptacle for positive gripping and clamping of the tool, the spindle drive comprising an externally threaded section on the spreading member and an internally threaded section on the tool receptacle, the latter being nonrotatably joined with the spindle rotor.

2. A machine tool as defined in claim 1, wherein the spreading member has a catch by means of which the externally threaded section is rotated relative to the internally threaded section.

3. A machine tool as defined in claim 2, wherein the catch is arranged for engagement with a coupling rod that is equipped on one end with a mating element complementary to the catch.

4. A machine tool as defined in claim 3, wherein the coupling rod is axially displaced by means of a piston-cylinder unit so that the catch and its mating element are being moved into or out of mutual engagement.

5. A machine tool as defined in claim 4, wherein the coupling rod is arranged in said axis of the spindle axis.

6. A machine tool as defined in claim 3, wherein the spreading member has a nonrotatably immobilized position such that the spindle drive is activated by rotation of the tool receptacle, the latter being nonrotatably joined with the spindle rotor.

7. A machine tool as defined in claim 6, wherein the coupling rod is provided with a coupling means for selective nonrotatable immobilization of the coupling rod.

8. A machine tool as defined in claim 7, wherein the coupling means is provided with a sensor for detecting the ratcheting operation.

9. A machine tool as defined in claim 6, wherein the coupling is a ratchet coupling with an adjustable threshold value for its holding torque.

10. A machine tool as defined in claim 1, wherein the tool receptacle is formed on a facing head arranged at said spindle rotor and adjusted in a numerically controlled way, in a direction perpendicular to the axis of the spindle.

11. A machine tool as defined in claim 10, wherein the facing head is adjusted in such a way that the catch and its mating element are brought into a mutually aligned position.

12. A machine tool as defined in claim 1, wherein the spreading member has a nonrotatably immobilized position such that the spindle drive is activated by rotation of the tool receptacle, the latter being nonrotatably joined with the spindle rotor.

* * * * *